Dec. 8, 1942.   R. L. HANSON   2,304,689
HOMOGENIZING VALVE
Filed June 7, 1939
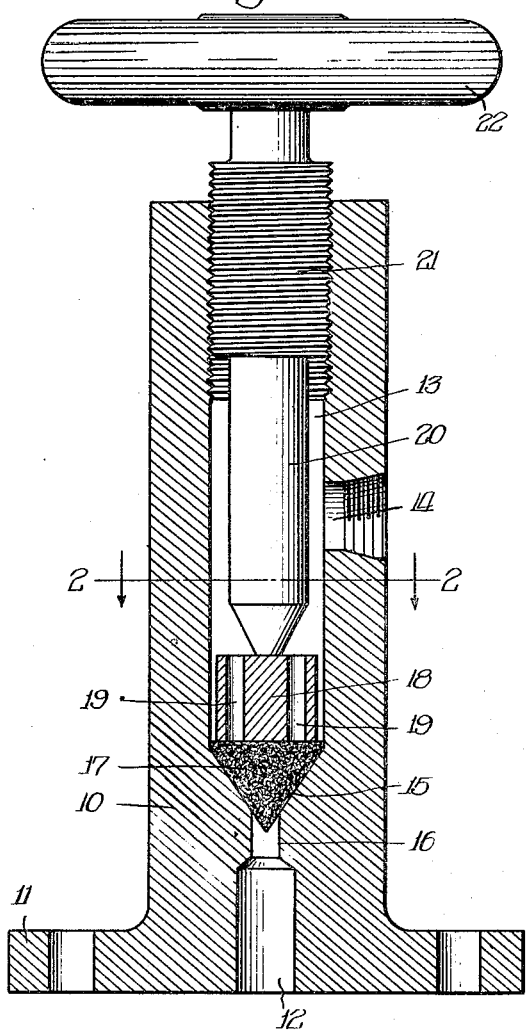
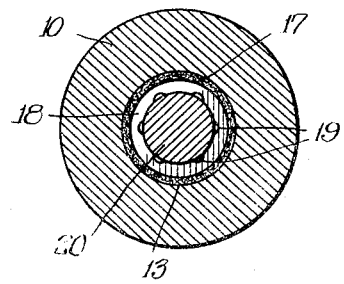
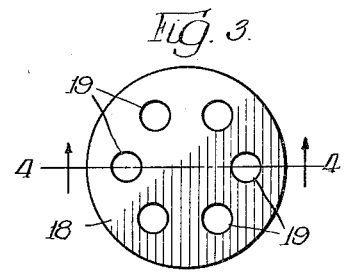
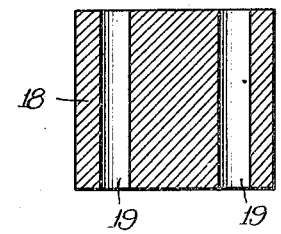
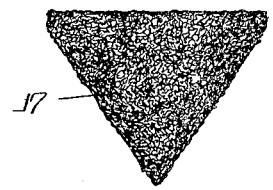
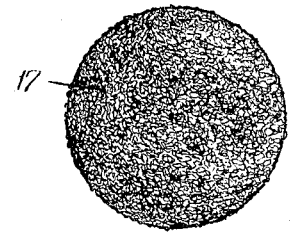
INVENTOR.
Rodney L. Hanson,
BY
ATTORNEY Patented Dec. 8, 1942

2,304,689

UNITED STATES PATENT OFFICE 2,304,689

HOMOGENIZING VALVE

Rodney L. Hanson, Chicago, Ill., assignor to The Creamery Package Mfg. Company, Chicago, Ill., a corporation of Illinois Application June 7, 1939, Serial No. 277,881

8 Claims. (Cl. 99—265)

The invention relates to apparatus for homogenizing liquids, such as milk and milk products, and more particularly relates to an improved homogenizing valve for such apparatus.

The purpose in homogenizing liquid milk products is to break up the normal butter fat globules into smaller particles and to effect a uniform dispersion of the latter within the milk serum in a state of stable emulsion. Proper homogenization prevents the normal separation or "rising" of the butter fat when the liquid is in quiescent state. In general practice, homogenization is accomplished by pumping the liquid under high pressure through a restricted valve orifice wherein the extreme velocity and confined area of flow between the slightly opened valve and its seat cause the disruption or shearing of the fat globules into particles small enough to remain in stable suspension in the encompassing liquid. Various modifications of the familiar poppet type of valve are commonly used, the valve being resiliently held to its seat by strong spring pressure. Some valves in use employ annular disks or plates resiliently held together under strong pressure and between which the liquid is forced at high velocity.

An objectionable consequence of the treatment in the commonly used homogenizing valve is that the broken-up particles of fat gather in clusters, and that the normal fluidity of the enveloping milk serum is lessened, producing an undesirably high degree of viscosity in the homogenized product. This is especially true in homogenizing table cream and ice cream mix. Subsequent treatment is usually applied by passing the liquid, under relatively low pressure and velocity, through a second valve, or other flow restrictive means, wherein the fat clusters are more or less dispersed and redistributed in the suspending serum, and the viscosity is reduced.

The principal object of my invention is to provide an homogenizing valve which will operate at relatively low pressure and will sufficiently break up and disperse the butter fat globules in one treatment so that the resultant particles of fat will remain in stable phase relation without clustering and without producing undesirable viscosity. I have provided a valve, as herein disclosed, by which these results are accomplished with more uniform size and dispersion of the fat particles than has been attained heretofore, and with substantial economy in the cost of the pumping apparatus and in the power necessary to operate it resulting from the low pressure required.

Some of the objections to clustered fat, generally sought to be overcome, are that it appears as floating oil when cream containing it is used in hot beverages. Clustered fat in ice cream mix tends to churn out as butter during the processing of the ice cream and detracts from its taste quality. It is contributory to excessive viscosity which seriously interferes with the cooling processes and has an undesirable effect upon the body and texture of the finished product.

From my investigations of the homogenizing valves heretofore in use, there appears a common characteristic that the path of flow provided between the strongly spring pressed valve and its seat, or between equivalent members, wherein the break-up of the fat globules is accomplished, is an extremely thin attenuated passage through which the liquid is forced under very high pressure and with extreme velocity. This common characteristic condition appears to result in breaking up the fat globules and then in compacting the broken-up particles in clusters while still within the confining passage. There is evidence that this condition also alters the normal state of the casein, which increases the viscosity of the milk serum.

The commonly used valve is designed to wholly accomplish the break-up of the fat globules in the initial valve orifice passage, with a pressure drop nearly equal to the initial head pressure. Any subsequent low pressure valves or impact abutments that are provided are used to reduce the fat clusters and high viscosity produced in the initial high pressure orifice. Initial pressure of from 2500 lbs. to 3500 lbs. is commonly used, with a pressure drop at the discharge side of the valve orifice to a few hundred pounds, if a second valve is used, or to atmosphere if not used. Such pressures appear necessary to break up the fat in a single treatment. It appears also that the fat clustering effect and high viscosity are an unavoidable consequence of the extreme velocities attained with such pressure differentials.

I have overcome these commonly recognized difficulties by providing an homogenizing valve having a multitude of minute heterogeneous orifices resiliently defined by a matrix of fine spring wire matted in plug form and functioning as the valve member. The wire matrix provides a succession of orifices in which the liquid flow is not attenuated, and the shearing velocities attained are of only instant duration, whereby the instant break up of the fat globules in the matrix orifices is followed by a drop in velocity and the dispersion of the fat particles. The succession of irregular orifices provides flow paths for the liquid by which it is subjected to repetitive shearing velocities with relatively small pressure drop after each orifice. The repeated shearing steps with gradual pressure drop accomplishes the required break up of the fat globules to the fineness of particles necessary for a stable suspension without the clustering effect. Further, the flow paths through the matrix valve are tortuous in direction, being a succession of alternate orifices and cross communicating pockets, in the latter of which adjacent streams are intermingled with such turbulence as to materially aid in the complete dispersion of the fat particles. The repetitive shearing with low pressure differentials, and the random flow and turbulent intermingling of the liquid streams, causes a uniform break up of the fat globules and produces a stable phase relation in the liquid without the production of objectionable viscosity.

Most satisfactory results with my valve are obtained with initial pressures substantially less than is required with the commonly used valves, as, for example, pressures between 1000 lbs. and 1500 lbs. It has been recognized that such lower initial pressures per se materially lessen the tendency to fat clustering and high viscosity, but the necessary break up of the fat globules cannot be accomplished at such lower pressure with the commonly used valves. In my matrix valve, the repetitive shearing of the fat globules, with low orifice pressure drop and effective dispersion characteristics, accomplishes at the lower initial pressures the uniform break up of the fat to the required degree for stable suspension. The lower initial pressures permit material savings to be made in the structural design and operating cost of the complete homogenizing machine.

The spring wire structure comprising my matrix valve possesses inherent resiliency which permits the application to it of variable compression force whereby the multitude of orifices may be varied in their effective flow passage dimensions and the consequent velocities so that the valve may be adjusted by changing the compression to secure the best result in the treatment of the range of milk products, from low fat whole milk to concentrated cream and condensed milk. The resilient quality of the wire permits it to shift position slightly under pulsation peaks of pressure and return to original position after relief from the pressure peaks, thus preventing the compacting of the structure and avoiding clogging of the passages.

The repetitive shearing treatment, aided to some extent by the resiliency of the valve structure, levels out the variations in degree of fat break up caused by the pressure and velocity pulsations characteristic of the commonly used reciprocating high pressure pump. My valve therefore produces a uniformity in size of the broken up fat particles not attainable in the homogenizing valves heretofore in use.

Another advantage in the use of the wire matrix valve is its low cost of production. The user may discard the valve after the day's run, and start the next run with a new sterile valve, without material expense. The perfect sanitary condition of the homogenizing valve at all times is thus assured.

Other objects and advantages will be apparent in the following detailed description of the preferred embodiment of my invention which I have selected for illustration in the accompanying drawing. It will be understood, however, that various changes in form, construction and arrangement may be made by those skilled in the art without departing from the spirit and scope of the invention as expressed in the appended claims.

Referring to the drawing, Fig. 1 is a sectional view in elevation of an assembled valve unit. Fig. 2 is a sectional plan view taken on the plane of the line 2—2 in Fig. 1. Fig. 3 is a plan view of the compression block. Fig. 4 is a sectional view in elevation taken on the plane of the line 4—4 in Fig. 3. Figs. 5 and 6 are respectively a side view in elevation and a plan view of the wire matrix valve member.

In the drawing, the numeral 10 indicates a valve casing having a base flange 11 adapted for attachment, as by bolts, to a conventional homogenizer pump structure. The casing 10 is provided with an axial inlet passage 12 having communication, when so attached, with the pump discharge passage. The inlet passage 12 opens into a chamber 13 extending upwardly through the casing and having an outlet port 14 adapted for suitable discharge pipe connection. A valve seat 15 is formed in the casing at the lower end of the chamber 13, the seat being tapered preferably at an angle of approximately 35 degrees from the axis of the chamber. The communicating portion 16 of the inlet passage 12 is preferably restricted in cross area. Normally positioned upon the valve seat 15 is a similarly tapered cone shaped valve member 17 comprising a resilient mass or matrix of matted spring wire having interstices throughout its structure for the restricted flow of liquid through the valve member, and wherein homogenization is effected as hereinbefore described.

A compression block 18 is positioned upon the inverted base of the valve member 17, the block being provided with a plurality of flow passages 19 extending through the block. Bearing upon the upper face of the block 18 is an adjustable compression stem 20 having an enlarged portion 21 in screw-threaded engagement with the casing 10 and forming an upper end closure of the chamber 13. A handle 22 is secured to the outwardly extended upper end of the stem 20, by which the latter may be rotated to effect, through the compression block 18, the desired compression of the valve member 17.

The wire used in forming the matrix valve is preferably of steel, but may be of any corrosion-resistant metal acceptable for contact with milk products, and within a size range of from .003 to .015 inch in diameter. The wire is spring tempered to a degree which permits its being formed as described without breaking, and yet retains its resiliency within the range of operating compression and flow pressures so that the interstitial flow passages are free in all portions of the valve member. If the wire is too soft, or not rightly tempered, the valve member will not sustain the high pressures and velocities, and the wire convolutions will compact and clog the passages. I have found it to be advantageous to crimp the wire before forming the valve member. The valve may be formed by rolling or bunching the requisite length of wire into a ball or approximate cone, and then, compressing it in a mould of the required shape and dimensions. The valve may be formed in other than cone shape but the latter is preferable in that it provides a progressively increased flow area from the inlet-apex end of the valve to the outlet-base end, whereby the mean velocity and pressure of the flowing liquid is progressively decreased.

I claim as my invention:

1. In an homogenizing valve, a valve member comprising a heterogeneously closely matted structure of spring wire, the inter-related convolutions of said wire forming restricted flow passages for a liquid to be homogenized, said flow passages being sustained open under operating pressures throughout said matted structure by reason of the resilient resistance to deformation inherent in said spring wire.

2. In an homogenizing valve, a valve member formed of a heterogeneous matrix of crimped resilient wire, said wire being partially compacted and providing a multitude of minute heterogeneous interstitial passages through said member for the flow of a liquid to be homogenized.

3. In an homogenizing valve, a valve member comprising a formed mass of resilient wire, the convolutions of said wire being dissimilarly spaced and defining a multitude of minute irregular intercommunicating orifices and pockets within said member for the random flow of liquid therethrough, and means for adjustably compacting said member to vary the inter-relation of the convolutions of said wire and thereby vary the effective flow areas of said orifices and pockets.

4. In an homogenizing valve, a valve member comprising a partially compacted mass of irregularly spaced convolutions of crimped spring wire forming a plurality of dis-similar pockets and forming minute irregular inter-communicating orifices between said pockets, said pockets and said orifices providing restricted tortuous flow passages for a composite liquid under pressure wherein variant flow velocities may be attained to effect a repetitive breaking-up of one or more of the components of said liquid and the dispersion thereof in other of said components in stable phase relation.

5. In a homogenizing valve, a valve member constructed of a matrix comprising resilient, non-corrosive crimped wire incorporating therein a multitude of minute interstitial, irregular and intercommunicating orifices and pockets for the flow therethrough of liquid under pressure, and means for varying the pressure upon said matrix whereby the effective velocity of flow of liquid through said orifices and pockets may be varied.

6. In a homogenizing valve, a resilient valve member comprising a cone-shaped mat of spring-tempered wire the convolutions of which define a multitude of minute irregular, intercommunicating orifices and pockets within said mat for the random flow of liquid therethrough, and means for adjustably compacting said mat to vary the inter-relation of the said convolutions whereby the effective velocity of flow of liquid through said orifices and pockets maye be varied.

7. In a homogenizing valve, a replaceable resilient valve member comprising a mat formed of heterogeneous convolutions of spring tempered wire whereby a multitude of minute irregular, intercommunicating orifices and pockets are formed within said mat for the random flow of liquid therethrough, and means for varying the pressure upon the said convolutions to vary the effective flow areas and volumes of said orifices and pockets.

8. A homogenizing valve member through which the liquid to be homogenized passes, which member comprises a heterogeneously closely matted structure of interrelated convolutions of crimped spring wire that form restricted interstitial flow passages within said matted structure, said flow passages constituting dissimilar pockets with irregular intercommunicating orifices therebetween, and being sustained open throughout said matted structure within the range of operating compression and flow pressures to which said matted structure is subjected, by reason of the resilient resistance to deformation inherent in said spring wire.

RODNEY L. HANSON.